United States Patent
Yoshioka et al.

(10) Patent No.: US 11,732,096 B2
(45) Date of Patent: Aug. 22, 2023

(54) FIBER-REINFORCED COMPOSITE MATERIAL AND METHOD FOR MANUFACTURING SAME

(71) Applicants: NATIONAL AGRICULTURE AND FOOD RESEARCH ORGANIZATION, Tsukuba (JP); KOWA COMPANY, LTD., Nagoya (JP)

(72) Inventors: Taiyo Yoshioka, Tsukuba (JP); Tsunenori Kameda, Tsukuba (JP); Tamako Hata, Tsukuba (JP); Akimune Asanuma, Tsukuba (JP); Norihiko Fukuoka, Tsukuba (JP)

(73) Assignees: NATIONAL AGRICULTURE AND FOOD RESEARCH ORGANIZATION, Tsukuba (JP); KOWA COMPANY, LTD., Nagoya (JP)

(*) Notice: Subject to any disclaimer, the term of this patent is extended or adjusted under 35 U.S.C. 154(b) by 0 days.

(21) Appl. No.: 16/644,055

(22) PCT Filed: Aug. 30, 2018

(86) PCT No.: PCT/JP2018/032195
§ 371 (c)(1),
(2) Date: Mar. 3, 2020

(87) PCT Pub. No.: WO2019/049771
PCT Pub. Date: Mar. 14, 2019

(65) Prior Publication Data
US 2020/0407518 A1    Dec. 31, 2020

(30) Foreign Application Priority Data
Sep. 5, 2017   (JP) .................... 2017-170648

(51) Int. Cl.
*C08J 5/04* (2006.01)
*C08L 23/08* (2006.01)
*C08J 5/24* (2006.01)

(52) U.S. Cl.
CPC ............... *C08J 5/048* (2013.01); *C08J 5/042* (2013.01); *C08J 5/045* (2013.01); *C08J 5/247* (2021.05);
(Continued)

(58) Field of Classification Search
CPC ..... C08J 5/042; C08J 5/24; C08J 5/048; C08J 5/045; C08J 5/04; C08J 5/247;
(Continued)

(56) References Cited

U.S. PATENT DOCUMENTS

2010/0040816 A1\*   2/2010  Verpoest .................. C08J 5/045
                                                      428/221
2017/0226674 A1\*   8/2017  Jerez ......................... B32B 5/02
2019/0329526 A1   10/2019  Ono et al.

FOREIGN PATENT DOCUMENTS

DE      102016109843 A1 \* 11/2017  ............... B32B 1/00
JP         2001207585      \*  8/2001
(Continued)

OTHER PUBLICATIONS

Composite World, Fiber reinforcement forms, published Jan. 8, 2009.\*
(Continued)

*Primary Examiner* — Camie S Thompson
(74) *Attorney, Agent, or Firm* — Lucas & Mercanti, LLP (57) ABSTRACT

An object of the present invention is to develop and provide a fiber-reinforced composite material having an "elongation" feature in addition to a high strength and a high elastic modulus. Further, an object of the present invention is to address problems of brittleness and peeling in the conven-
(Continued)

A

B tional fiber-reinforced composite materials. A fiber-reinforced composite material containing the bagworm silk thread as reinforcing fibers is provided.

5 Claims, 2 Drawing Sheets (52) U.S. Cl.
CPC ....... *C08L 23/0853* (2013.01); *C08J 2323/08* (2013.01); *C08J 2489/00* (2013.01); *C08L 2205/16* (2013.01)

(58) Field of Classification Search
CPC ... C08J 2489/00; C08L 89/00; C08L 2205/16; C08L 23/0853; C08L 2323/08; Y10T 442/3179; D04H 1/09; B32B 2262/08; B32B 2262/108; B32B 2262/101; B32B 2262/106; B32B 2262/0292; B32B 2262/0276; B32B 2262/065; B32B 2262/0269; B32B 2262/103; B32B 2262/104; B32B 2260/021; B32B 2260/046; B32B 9/02; B32B 5/024; B32B 5/026; B32B 1/02; B32B 27/04; B32B 27/12; D03D 25/00; D03D 13/00; B29C 55/00; B29C 51/00
USPC ........ 524/21; 442/181, 203; 428/221, 297.4, 428/36.4, 535, 222
See application file for complete search history.

(56) References Cited

FOREIGN PATENT DOCUMENTS

| | | | |
|---|---|---|---|
| JP | 2001207585 A | 8/2001 | |
| WO | 2012165477 A1 | 12/2012 | |
| WO | 2018116979 A1 | 6/2018 | |

OTHER PUBLICATIONS

Osaki et al., "Why are Bagworm's Silks Mechanically Strong?", Polymer Preprints, 2001, vol. 50, No. 14, pp. 3493-3494, English translation 3 pages.
Reddy et al., "Structure and properties of ultrafine silk fibers produced by Theriodopteryx ephemeraeformis", J Mater Sci, 2010, vol. 45, pp. 6617-6622.
Yang et al., "High volume-fraction silk fabric reinforcements can improve the key mechanical properties of epoxy resin composites", Materials and Design, 2016, No. 108, pp. 470-478.
Supplementary European Search Report for Corresponding European Application No. 18853035.6, dated May 10, 2021, 6 Pages.
Hiramatsu, Well Understandable Introduction for Carbon Fiber Composite, Nikkan Kogyo Shimbun, Ltd. 2015, Chapter 1, 16 pages.
Mathijsem, "Beyond carbon fiber: What will be the fibers of choice for future composites?", Reinforced Plastics, 2016, vol. 60, No. 1, pp. 38-44.
Kuwana et al., "High-Toughness Silk Produced by a Transgenic Silkworm Expressing Spider (*Araneus ventricosus*) Dragline Silk Protein", Plos One, 2014, vol. 9, issue 8, pp. 1-11.
International Search Report for International Application No. PCT/JP2018/032195 (2 Pages) (dated Dec. 4, 2018).
Mehdikhani et al., "Voids in fiber-reinforced polymer composites: A review on their formation, characteristics, and effects on mechanical performance", Journal of Composite Materials, 2019, vol. 53, No. 12, pp. 1579-1669.

\* cited by examiner

FIBER-REINFORCED COMPOSITE MATERIAL AND METHOD FOR MANUFACTURING SAME

CROSS-REFERENCE TO RELATED APPLICATIONS

This application is a 371 of PCT/JP2018/032195, filed Aug. 30, 2018, which claims benefit of Japanese Patent Application No. 2017-170648, filed Sep. 5, 2017.

TECHNICAL FIELD

The present invention relates to a fiber-reinforced composite material containing bagworm silk threads as reinforcing fibers and a method for producing the same.

BACKGROUND ART

A fiber-reinforced composite material, which is complexed with reinforcing fibers and a base material, is a light-weight material having a high strength and a high elastic modulus, as represented by Carbon Fiber-Reinforced Plastics (CFRP) or Glass Fiber-Reinforced Plastics (GFRP). Such a high strength and a high elastic modulus are mainly based on the mechanical features of reinforcing fibers, such as carbon fiber, glass fiber, and aramid fiber. For example, carbon fiber is known to have a mechanical property about 10 times higher than that of iron in terms of specific strength found by dividing the strength by the mass of a material (Non-Patent Literature 1). Because of such mechanical feature, a fiber-reinforced composite material is used as an alternative material to metal in various fields including sports/leisure-time goods, automobiles, houses, buildings, and aircrafts.

However, conventional reinforcing fibers to be used for fiber-reinforced composite materials have a common feature of "being unextendible". The feature of the reinforcing fibers has been a major cause of the "brittleness" of fiber-reinforced composite materials and "peeling" at the interface between a reinforcing fiber and a base material. Particularly, an increase in flexibility of a base material has resulted in a serious problem of peeling of reinforcing fibers from the base material within a fiber-reinforced composite material.

Accordingly, this problem is attempted to be solved by the use of a fiber having a high strength, a high elastic modulus, and an elongation feature as a next-generation reinforcing fiber for a fiber-reinforced composite material. For example, spider-derived threads (herein often referred to as "spider thread") having very high toughness and an elongation feature are currently focused as reinforcing fibers (Non-Patent Literature 2).

However, the actual use of the spider thread as reinforcing fiber poses many practical problems to be solved. For example, mass breeding of spiders and mass collection of threads from spider are difficult. Thus, the spider thread cannot be mass-produced and is the high production cost. This problem has been recently attempted to be solved through production of the spider thread by *Escherichia coli* or silkworm using transgenic technology (Patent Literature 1 and Non-Patent Literature 3). However, since *Escherichia coli* and the silkworm to be used for production of the spider thread are genetic transformants, culturing or breeding can be performed only within a facility with predetermined equipment. Therefore, new problems arise, such that a large scale production facility is required for mass production, and the maintenance and control load is increased. Further, the protein of the spider thread expressed within *Escherichia coli* is the liquid form, so that a process of converting the proteins into fibers is required. However, at present, any process of converting into fibers with reproducing the mechanical properties of natural fibers has not yet been found. Furthermore, the production of the spider thread also has problems that the number of processes increases and thereby the production cost becomes higher.

CITATION LIST

Patent Literature

Patent Literature 1: WO2012/165477

Non-Patent Literatures

Non-Patent Literature 1: Toru Hiramatsu, "Well Understandable Introduction for Carbon Fiber Composite", NIKKAN KOGYO SHIMBUN, LTD. 2015, Chapter 1.
Non-Patent Literature 2: Mathijsen D., 2016, Reinforced Plastics, 60: 38-44.
Non-Patent Literature 3: Kuwana Y, et al., 2014, PLoS One, DOI: 10.1371/journal.pone.0105325

SUMMARY OF INVENTION

Technical Problem

An object of the present invention is to develop and provide a fiber-reinforced composite material having a high-strength, a high elastic modulus, and an "elongation" feature which is absent in the conventional fiber-reinforced composite materials. Accordingly, an object of the present invention is to solve problems of brittleness and peeling in conventional fiber-reinforced composite materials.

Solution to Problem

In order to achieve the above objects, the inventors focused on silk thread spun by a bagworm (Basket worm, alias "bag worm") (herein often referred to as "bagworm silk thread"). The larva of moths belonging to the family Psychidae in the order Lepidoptera is collectively referred to as bagworm and are known to usually hide themselves inside spindle-shaped or cylinder-shaped nests (Bag nests) made of pieces of leaves and twigs assembled with threads and spend the entire larval stage living with the nests such that they carry the nests, for example, even during eating.

The bagworm silk threads have strength and elongation in a good balance, and thus have mechanical properties superior to those of the silkworm silk and the spider thread. For example, bagworm silk threads from *Eumeta minuscula* have an elastic modulus 3.5 times higher than that of silkworm silk threads and 2.5 times higher than that of the spider thread from *Nephila clavata* (Shigeyosi Ohsaki, 2002, Sen'i Gakkaishi (Sen'i To Kogyo), 58: 74-78; Gosline J. M. et al., 1999, J. Exp. Biol. 202, 3295-3303). Moreover, the inventors revealed that bagworm silk threads from *Eumeta japonica* have superior mechanical properties compared to those of the silkworm silk thread or the spider thread derived from *Araneus ventricosus* (Japanese Patent Application No. 2017-110003). For example, the elastic modulus was about 5 times higher than that of silkworm silk threads and at least 3 times higher than that of the spider thread. Further, the fracture strength was at least 3 times higher than that of silkworm silk threads, and about two times higher than that of the spider thread, and the elongation at break was at least 1.3 times higher than that of silkworm silk threads, and was almost equivalent to that of the spider thread. It was revealed that particularly the toughness was at least 4 times higher than that of silkworm silk threads, and at least 1.7 times higher than that of the spider thread, and the exhibited toughness was at the highest level among natural fibers.

Also, in terms of breeding and control, the bagworm has features superior to those of the silkworm. For example, the silkworm feed principally on only fresh leaves of species belonging to the genus *Morus*, such as *M. bombycis*, *M. alba*, and *M. lhou*, so that the breeding area and the timing for breeding are dependent on the regions where *Morus* leaves can be supplied and the period that the *Morus* leaves open. In contrast, bagworms are euryphagous and have low specificity for leaves for feed, and thus many kinds thereof can feed on leaves of various tree species. Therefore, leaves for feed can be easily obtained and any breeding area can be selected. Further, some bagworm species can feed also on evergreen tree leaves, and thus leaves for feed can be supplied throughout the year unlike a deciduous tree, such as the *Morus* tree. Moreover, since the bagworms are smaller in size than the silkworm, the breeding space equivalent to or smaller than that required by the silkworm is sufficient, and even the mass breeding thereof can be easily performed. Therefore, the breeding cost can be drastically suppressed compared with the silkworm.

Also, in terms of productivity, the bagworm is superior to the silkworm. For example, the silkworm spins threads in a large quantity only during spinning a cocoon, and the cocoon spinning is performed simultaneously among all larvae. This causes a problem such that times for collecting threads are concentrated and thus times for working are concentrated. On the other hand, bagworms repeatedly spin threads throughout the larval stage including nest building and migration. Hence, there is also an advantage that times for working can be diverged through artificial adjustment of the timing for collecting threads. Furthermore, bagworm silk threads can be directly collected from wild-type bagworms, and are advantageous in that the preparation, maintenance and control of genetic transformants are not required, unlike the production of the spider thread.

It was actually revealed that a fiber-reinforced composite material produced using bagworm silk threads as reinforcing fibers has an elastic modulus improved by at least 10 times that of a case of using only a polymer matrix. Moreover, when long-fiber bagworm silk threads were used, a problem of low breaking elongation, which has been a "problem to be solved" of Carbon Fiber-Reinforced Plastics (CFRP) or Glass Fiber-Reinforced Plastics (GFRP), could be significantly improved.

The present invention is based on the above results, and the followings are provided.

(1) A reinforcing fiber for a fiber-reinforced composite material, containing a bagworm silk thread(s).
(2) A fiber-reinforced composite material, containing a polymer matrix(es) and the reinforcing fiber(s) containing the bagworm silk thread(s).
(3) The fiber-reinforced composite material according to (2), containing the bagworm silk thread(s) comprising short fibers with a length of 1 mm or more and less than 1 m.
(4) The fiber-reinforced composite material according to (3), containing spun silk yarns of the bagworm silk threads.
(5) The fiber-reinforced composite material according to (2) or (4), containing the bagworm silk thread(s) comprising a long fiber with a length of at least 1 m.
(6) The fiber-reinforced composite material according to any one of (2) to (5), further containing an organic fiber(s) other than the bagworm silk thread, an inorganic fiber(s) or a combination thereof as the reinforcing fiber(s).
(7) The fiber-reinforced composite material according to any one of (2) to (6), containing the bagworm silk thread(s) placed in one or a plurality of directions.
(8) The fiber-reinforced composite material according to (7), containing fabric or knit composed all or part of the bagworm silk thread(s).
(9) The fiber-reinforced composite material according to any one of (2) to (8), wherein the polymer matrix is a resin, a glue, a starch, an agar, or a combination thereof.
(10) The fiber-reinforced composite material according to any one of (2) to (9), wherein the bagworm silk thread(s) in the fiber-reinforced composite material has a mass percentage ranging from 0.5 mass % to 50 mass %.
(11) A method for producing a fiber-reinforced composite material, comprising a contact process of bringing a reinforcing fiber(s) into contact with a polymer matrix(es), wherein the reinforcing fiber(s) contains a bagworm silk thread(s).
(12) The production method according to (11), comprising a molding process of forming the reinforcing fiber(s) and/or the polymer matrix(es) into a desired shape using a mold, and a curing process of accelerating and/or completing a polymerization reaction of the polymer matrix.
(13) The production method according to (12), further comprising a demolding process of removing the completed fiber-reinforced composite material from the mold.

The present specification encompasses the contents disclosed in the specification and/or drawings of Japanese Patent Application No. 2017-170648, on which the priority of the present application is based.

Advantageous Effects of Invention

According to the fiber-reinforced composite material of the present invention, the fiber-reinforced composite material having a high strength, a high elastic modulus, and an "elongation" feature that is absent in conventional CFRP or GFRP can be provided.

DESCRIPTION OF EMBODIMENTS

1. Reinforcing Fiber 1-1. Overview

The first aspect of the present invention is a reinforcing fiber. The reinforcing fiber of the present invention is a reinforcing fiber for a fiber-reinforced composite material, containing the bagworm silk thread. According to the reinforcing fiber of the present invention, a high strength, a high elastic modulus, and an elongation property can be imparted to the fiber-reinforced composite material.

1-2. Definition

The following terms frequently used herein are defined as follows.

The term "fiber-reinforced composite material" refers to a material in which two or more types of different materials, specifically a reinforcing fiber(s) and a base material are integrally combined without fusing to each other and thus are separated from each other.

The term "reinforcing fiber" as used herein refers to a fiber base material(s) in a fiber-reinforced composite material. Generally, the reinforcing fiber is a reinforcing material that imparts strength to the fiber-reinforced composite material. However, this term as used herein refers to a reinforcing material that imparts at least one of properties of strength, elastic modulus, and elongation to the fiber-reinforced composite material.

The term "base material" as used herein is also referred to as "matrix", and refers to a supporting base material in a fiber-reinforced composite material. In general, strength is imparted to the base material by the reinforcing fiber in the fiber-reinforced composite material. However, the "reinforcing fiber" as used herein does not only become a reinforcing agent itself, but also the base material also becomes a reinforcing material for imparting strength to the reinforcing fibers as an infill for filling the space between reinforcing fibers. Specifically, in the fiber-reinforced composite material of the present invention, each constituent material mutually increases their advantages, and/or mutually compensate for their disadvantages. Accordingly, a fiber-reinforced composite material having new properties that original materials do not have can be obtained.

The term "polymer matrix" as used herein refers to a base material made of an organic polymer and/or an inorganic polymer.

The term "silk thread" as used herein refers to a thread made of the protein and spun by larva or adult of insect for identification, migration, fixing, spinning cocoon, capturing preys, and the like. The term "silk thread" as used herein includes single filament, spun fiber, spun silk yarn, and fiber assembly.

The term "single filament" as used herein refers to a filament (monofilament) thread that is a minimum unit constituting silk thread, and a fibrous component such as a fibroin protein obtained by removing a coating component such as a sericin protein from a spun fiber described later. The single filament is, in principle, absent under natural conditions, and is obtained by refining spun fiber.

The term "spun fiber" as used herein refers to silk thread spun by the insect. For example, a spun fiber of a bagworm is composed of defilement made of a set of two single filaments bound with a coating component.

The term "spun silk yarns" as used herein refers to spun thread obtained by spinning of silk threads made of short filaments described later.

The term "fiber assembly" as used herein refers to a fiber composed of a plurality of silk fiber bundles, and is also referred to as "multi-filament". The term "fiber assembly" as used herein is composed of single filaments, spun fibers, spun silk yarns, or a combination thereof. The fiber assembly as used herein includes a fiber assembly composed of only silk threads derived from the same biological species, such as the bagworm silk thread only, and a mixed fiber composed of silk threads derived from a plurality of different species, such as the bagworm silk thread and the silkworm silk thread. Incidentally, the bagworm silk thread or the like may be derived from any biological species. Further examples of the fiber assembly include not only twisted fibers, but also non-twisted fibers.

The silk or silk thread simply described herein refers to a bagworm silk thread(s), unless otherwise specified.

The term "bagworm" collectively refers to a moth larva belonging to the family Psychidae in the order Lepidoptera, as described above. Moths belonging to the family Psychidae are distributed worldwide and larvae (bagworms) of any species of the moths spend the whole larval stages living in nests covered with natural materials, such as pieces of leaves and twigs, which are assembled by silk threads spun by the larvae themselves. The nests are spindle-shaped, cylinder-shaped, or cone-shaped bag-like nests that can accommodate the whole body of a bagworm. Bagworms usually hide themselves inside the nests and always carry the nests even during eating and migration, and in principle, even pupate inside the nests.

The term "bagworm silk thread" as used herein refers to a silk thread spun by the bagworm.

1-3. Constitution

The reinforcing fiber of the present invention contains the bagworm silk thread(s). The bagworm silk thread to be used as the reinforcing fibers of the present invention may be derived from any kind of bagworm moths. For example, family Psychidae includes the genera *Acanthopsyche, Anatolopsyche, Bacotia, Bambalina, Canephora, Chalioides, Dahlica, Diplodoma, Eumeta, Eumasia, Kozhantshikovia, Mahasena, Nipponopsyche, Paranarychia, Proutia, Psyche, Pteroma, Siederia, Striglocyrbasia, Taleporia, Theriodopteryx, Trigonodoma*, and the like, and the bagworm silk thread may be derived from species belonging to any of these genera. Specific examples of bagworm moth species include *Eumeta japonica, Eumeta minuscula*, and *Nipponopsyche fuscescens*. Further, the instar stage of larva (bagworm) to be used herein may be any instar stages between first instar and last instar. In addition, the bagworms to be used herein may be female or male. For the purpose of obtaining thicker and longer bagworm silk thread, large bagworms are preferable. For example, among members of the family Psychidae, larger types are more preferred. Therefore, in view of obtaining thicker and longer bagworm silk thread, *Eumeta japonica* and *Eumeta minuscula* are suitable species of the bagworm to be used in the present invention. Further, in the case of larva within the same species, last instar is more preferable, and last instars of female is even more preferable since it grows large.

The bagworm silk thread includes foothold silk thread and nest silk thread, and the bagworm silk thread to be used as reinforcing fibers may be any of these threads, and may be a mixture of them. The term "foothold silk thread" refers to the silk thread spun by a bagworm prior to its migration, which have a function as a scaffold for preventing it from falling from branches, leaves, etc., upon its migration. The term "nest silk thread" refers to the silk thread composing bagworm's nest, which is spun for binding pieces of leaves and twigs and making the inner wall of the nest, which is its living quarter, comfortable. Generally, foothold silk thread is thicker and mechanically stronger than nest silk thread, and thus is more preferable as the reinforcing fiber.

The length of a bagworm silk thread to be used as a reinforcing fiber is not limited. Examples thereof include a short fiber (short-fiber silk thread), a long fiber (long-fiber silk thread), and a combination thereof.

The term "short fiber" as used herein refers to a silk thread having a long axis with a length of 1.0 mm or more and less than 1 m, 1.5 mm or more and less than 80 cm, 2 mm or more and less than 60 cm, 2.5 mm or more and less than 50 cm, 3 mm or more and less than 40 cm, 3.5 mm or more and less than 30 cm, 4 mm or more and less than 20 cm, 4.5 mm or more and less than 10 cm, and 5.0 mm or more and less than 5 cm. For example, fragment of the foothold silk thread and the nest silk thread corresponds to such category. When short-fiber silk thread is used as reinforcing fibers, the short fiber silk thread may be used as spun-silk yarns produced by spinning thereof, used after dispersing and placing individual short-fiber silk thread in a fiber-reinforced composite material, or used in combination thereof.

The term "long fiber" as used herein refers to a silk thread having a fiber length of 1 m or more, 2 m or more, preferably 3 m or more, more preferably 4 m or more, 5 m or more, 6 m or more, 7 m or more, 8 m or more, 9 m or more, or 10 m or more. The long-fiber silk thread may be any of fiber threads such as the single filaments and the spun fiber, pile threads such as spun silk yarns, and a combination thereof, as long as the fiber has the above length or longer. The upper limit of the fiber length of the long-fiber silk thread is not particularly limited. In the case of pile threads, the length thereof can be extended unlimitedly by spinning Meanwhile, in the case of fiber thread, the fiber length corresponds to the length of the long axis of a silk thread that can be continuously spun by a bagworm. For example, the fiber length is 1.5 km or less, 1 km or less, 900 m or less, 800 m or less, 700 m or less, 600 m or less, 500 m or less, 400 m or less, 300 m or less, 200 m or less, or 100 m or less. However, because of the unique ecology of the bagworm, obtaining 1 m or more of a fiber thread from a bagworm silk thread by the conventional technology has been impossible. In the case of silkworms, cocooning is carried out by continuous spinning, and a long fiber can thus be relatively easily obtained by cocoon scouring and reeling. However, since bagworms pupate in their nests where the bagworms spend their lives in their larval stage, and therefore do not perform cocooning behavior before pupation like the silkworm. Additionally, since a nest of a bagworm is extended as the bagworm grows from the first instar in principle, old and new silk threads are mixed together in the nest. In addition, a nest of a bagworm has an opening at one end of the longitudinal axis, out of which the bagworm exposes its head and a portion of the thorax for migration and eating, and an outlet for excretion at the other end for excretion of feces and the like. Since two openings are always present, so that silk threads are fragmented in the nest and are discontinuous. Thus, a bagworm nest is by its nature assembled by relatively short silk threads entangled with each other, and long-fiber silk threads cannot be obtained from the nest by conventional methods. A bagworm relatively continuously spits out foothold silk threads. However, the foothold silk threads function as an anchor for migration, and thus are spun in a zig zag manner, and a bagworm freely migrates randomly, so that the silk threads get entangled in a complicate manner, and reeling is difficult though the threads can be collected. However, the inventors developed a method that comprises placing a bagworm on a rail having a specific width, and thus causing the bagworm to spin foothold silk threads while it is placed almost in parallel to the rail, and thus succeeded in stable mass production of long-fiber bagworm silk thread (Japanese Patent Application No. 2017-110003).

When long-fiber silk threads are used, the orientation of the bagworm silk thread is not limited. A plurality of fiber bundles made of fiber threads or pile threads are placed in one direction or a plurality of, two or more directions, so that the bagworm silk thread can be cord-shaped, sheet-shaped, or shaped into a three-dimensional structure.

Examples of the fiber bundles of the bagworm silk thread placed in one direction include a case in which the threads are linearly aligned and paralleled planarly (UD material), and knit or the like, which is formed by interlocking continuous loops with adjacent fiber bundle loops while causing the fiber bundles of the bagworm silk thread to form the continuous loops (course), and then connecting longitudinal loops (wales) to form a plane (sheet). Knit structurally has its own elasticity. However, conventional major reinforcing fiber, such as carbon fiber and glass fiber, are broken when bent into the form of loop, and thus are difficult to be used for producing knit. On the other hand, a fabric can be easily produced using the bagworm silk thread because of the fiber's flexibility. Through the use of knit made of the bagworm silk thread as a reinforcing fiber, knit's own elasticity is added to a mechanical property such as the silk threads' own "elongation", and thus excellent features that are absent in conventional reinforced fiber composite materials can be obtained.

Examples of the fiber bundles of the bagworm silk thread placed in two directions include textile such as fabric and braided good. The term "fabric" is plane (sheet) cloth formed by weaving warp and weft. In the case of a fabric, it may be a plain weave in which warp and weft orthogonally cross each other or a twill weave, in which warp and weft diagonally cross each other. The term "braided good" refers to good produced by combining and shaping a plurality of fibers into cord or band, and examples thereof include braid, ribbon or woven cord, and knit braid. As a specific example, a braid is formed by interlacing a plurality of fibers cylindrically along a cored bar (mandrel) to construct a cord-shaped structure (braid).

Another example is a nonwoven fabric constructed by placing the fiber bundle of the bagworm silk thread randomly into three or more directions by forming a plane (sheet).

The reinforcing fiber of the present invention may be composed only of the bagworm silk thread, and may further contain different one or more other reinforcing fibers, as long as these fiber does not interfere with the effect of the present invention. Examples of other reinforcing fiber include organic fiber other than the bagworm silk thread and inorganic fiber. Examples of organic fiber include natural plant fiber mainly composed of cellulose such as cotton and linen, natural animal fiber such as silk thread obtained from insect e.g., domesticated the silkworm such as *Bombyx mori* (silkworm) and *Bombyx mandarina* (wild silkworm), which is larva of moth of the family Saturniidae and the spider thread, etc., and synthetic fiber such as aramid, polyamide (including nylon), polyester, polyethylene, acryl and rayon. Examples of inorganic fiber include carbon fiber, glass fiber, metal fiber (e.g., stainless, titanium, copper, aluminium, nickel, iron, tungsten, and molybdenum), and amorphous fiber (e.g., ceramic fiber and rock wool). Through combination of the bagworm silk thread with other reinforcing fiber, a synergistic effect exhibited by both reinforcing fiber can be obtained. For example, carbon fiber that is a reinforcing fiber of CFRP and glass fiber that is a reinforcing fiber of GFRP are proud of their significantly high strength and elastic modulus, but lack an elongation feature and thus have low toughness and are fragile. On the other hand, the bagworm silk thread also has a high strength and a high elastic modulus, but these properties are not equivalent to those of carbon fiber and glass fiber. However, the bagworm silk thread has an elongation feature that is absent in carbon fiber and glass fiber. Therefore, combining the bagworm silk thread with carbon fiber and/or glass fiber enables to use the advantages of both members as reinforcing fibers and to cause them to mutually compensate for their disadvantages. Through the use of reinforcing fiber produced by combining the bagworm silk thread with carbon fiber and/or glass fiber, a fiber-reinforced composite material having an extremely high strength and elastic modulus, and elongation feature can be produced.

When the reinforcing fiber of the present invention contains different other reinforcing fiber(s) in addition to the bagworm silk thread, the content of the bagworm silk thread in the reinforcing fiber to be used for the fiber-reinforced composite material is not limited, and may be 1% or more, 3% or more, 5% or more, 8% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 92% or more, 95% or more, 97% or more, 98% or more, or 99% or more.

When the reinforcing fiber includes other reinforcing fiber(s) in addition to the bagworm silk thread and long-fiber silk thread are used for the "other reinforcing fiber", the orientation etc. of the other reinforcing fiber may be principally the same as that of the above the bagworm silk thread. Hence, specific descriptions thereof are omitted.

2. Fiber-Reinforced Composite Material 2-1. Overview

The second aspect of the present invention is a fiber-reinforced composite material. The fiber-reinforced composite material of the present invention is characterized in that the reinforcing fiber(s) for a fiber-reinforced composite material according to the first aspect, specifically, the reinforcing fiber(s) containing bagworm silk thread(s), is used as a fiber base material. According to the present invention, a fiber-reinforced composite material having a high strength and a high elastic modulus, and further an elongation property that is absent in conventional CFRP and GFRP can be provided.

2-2. Constitution 2-2-1. Components

The fiber-reinforced composite material of the present invention contains a polymer matrix(es) and a reinforcing fiber(s) containing a bagworm silk thread(s) as essential component.

(Polymer Matrix)

The term "polymer matrix" refers to a base material comprising an organic polymer and/or inorganic polymer, and examples of a polymer matrix to be used for the fiber-reinforced composite material of the present invention include either an organic polymer or an inorganic polymer, or both polymers. Here examples of the organic polymer include a naturally occurring polymer and a synthetic polymer.

The naturally occurring polymer is polymer existing in the natural world, and for example, protein, polysaccharide, and natural resin are applicable thereto. Specific examples of the protein include glues (including collagen and gelatin). Further, specific examples of polysaccharide include starch, cellulose, mannan, and agar. Moreover, specific examples of natural resins include Japanese lacquer, rosin, latex (natural rubber), and shellac.

Synthetic polymer is obtained by linking monomers via condensation polymerization or addition polymerization, and examples thereof include synthetic resin and synthetic rubber.

Synthetic resin is also referred to as plastic. A synthetic resin to be used as a polymer matrix in the fiber-reinforced composite material of the present invention may be any of a thermosetting resin, a thermoplastic resin, or a combination thereof. Examples of a thermosetting resin include an epoxy resin, an unsaturated polyester resin, a vinyl ester resin, and a phenol resin. Further, examples of a thermoplastic resin include polyethylene, polypropylene, polyester, polystyrene, polyvinyl chloride, a methacrylate resin, a fluorocarbon resin, polycarbonate, polyurethane, an aromatic polyether ketone resin, and a poly phenylene sulfide resin.

Examples of synthetic rubber include butadiene rubber, chloroprene rubber, styrene-butadiene rubber, isoprene rubber, ethylene propylene rubber, nitrile rubber, silicone rubber, acrylic rubber, fluorocarbon rubber, and urethane rubber.

(Reinforcing Fiber)

Reinforcing fiber to be used for the fiber-reinforced composite material of the present invention is the reinforcing fiber according to the first aspect, specifically, the reinforcing fiber containing the bagworm silk thread. The specific constitution of the reinforcing fiber is already described in detail for the first aspect, and thus the description thereof is omitted herein.

(Component Ratio)

The compound ratio of reinforcing fiber and a polymer matrix in the fiber-reinforced composite material of the present invention is not limited. In general, these members may be mixed with a ratio such that target properties of the reinforcing fiber including high strength, high elastic modulus, elongation, and the like can be imparted to the polymer matrix as a base material. In the fiber-reinforced composite material of the present invention, a mixing percentage with which elongation property, that is, a property of the bagworm silk thread can be imparted to the polymer matrix, in addition to high strength and high elastic modulus, is preferable. Specifically, the mass percentage of the bagworm silk thread relative to the total dry mass of the fiber-reinforced composite material ranges from 0.5 mass % to 50 mass %, 0.8 mass % to 40 mass %, 1 mass % to 35 mass %, 1.5 mass % to 30 mass %, 2 mass % to 28 mass %, or 3 mass % to 25 mass %.

2-2-2. Structure

The structure of the fiber-reinforced composite material of the present invention, specifically, the placement of reinforcing fiber and a polymer matrix in the fiber-reinforced composite material is not particularly limited. Examples of the placement include a state wherein short-fiber reinforcing fibers are dispersed in a polymer matrix and/or on the surface thereof, a state wherein a polymer matrix layer and a reinforcing fiber layer are integrated via lamination, and a state wherein a plurality of prepregs etc. in which sheet-shaped reinforcing fiber is impregnated with a liquid polymer matrix are laminated so that the orientations of the reinforcing fibers are varied, and thereby integrated as a structure. Incidentally, a prepreg is an intermediate material for the fiber-reinforced composite material and is included herein in the fiber-reinforced composite material.

2-3. Effects

The fiber-reinforced composite material of the present invention contains the bagworm silk thread as the reinforcing fiber, so that a fiber-reinforced composite material exhibiting an elongation property that is absent in conventional fiber-reinforced composite materials, CFRP and GI-RP, can be provided.

2-4. Use

The fiber-reinforced composite material of the present invention can be used in various fields, including the use of conventional fiber-reinforced composite material. Examples of the use include sports/leisure goods (e.g., golf shaft, racket, fishing rod and automobile part), house (e.g., bath and septic tank), civil engineering and construction (e.g., aseismatic reinforcing material, light-weight construction material, wall, floor reinforcing material and truss structural material), transportation equipment (e.g., automobile, ship, airplane, helicopter and high pressure hydrogen tank), industrial equipment (e.g., cabinet, electronic appliance part, printed wiring board, blade for wind power generation), and space-related equipment (e.g., rocket and artificial satellite). Particularly, the fiber-reinforced composite material of the present invention has an elongation property that is not seen in conventional fiber-reinforced composite material, and thus can be suitably used in the field of materials required to have an elongation property in addition to strength and elastic modulus.

Further, when the bagworm silk thread alone or the bagworm silk thread and other silk thread(s) are used as reinforcing fiber, and a natural organic polymer such as collagen or gelatin is used as a polymer matrix, the fiber-reinforced composite material having high biocompatibility can be obtained. Therefore, such fiber-reinforced composite material can be used in the medical field as a base material for tissue regeneration, revascularization, and the like.

3. Method for Producing Fiber-Reinforced Composite Material 3-1. Overview

The third aspect of the present invention is a method for producing a fiber-reinforced composite material. The method of the present invention is a method for producing and/or molding the fiber-reinforced composite material according to the second aspect. According to the production method of the present invention, a fiber-reinforced composite material containing the bagworm silk thread can be easily produced and molded.

3-2. Method

The method for producing the fiber-reinforced composite material of the present invention is basically performed according to a conventional method for producing a fiber reinforced complex, except for using the bagworm silk thread as reinforcing fibers. For example, when long-fiber the bagworm silk thread is used as reinforcing fibers, in general, a production method employed for CFRP or GFRP can be directly employed. Various methods are known as such production method, and an appropriate method may be selected depending on purposes such as uses and shapes.

For example, a method for producing a prepreg comprises impregnating a fabric, knit, or nonwoven fabric of bagworm silk thread-containing reinforcing fiber with an appropriate polymer matrix. When the polymer matrix is a thermosetting resin, the resulting prepreg is a semi-cured prepreg in which polymerization is uncompleted. On the other hand, when the polymer matrix is a thermoplastic resin or a naturally occurring polymer such as collagen, the resulting prepreg is a cured prepreg in which polymerization is completed.

Examples of major molding methods include a filament-winding molding method, a sheet-winding molding method, a press molding method, an autoclave molding method, RTM (Resin Transfer Molding) method, VaRTM (Vacuum Resin Transfer Molding) method, SMC (Sheet Molding Compound) molding method, a vacuum bag molding method, a hand lay-up molding method, and a fiber placement molding method.

The "filament-winding molding method" comprises coordinating 1 to several tens of tows (bundles of 1000 to several tens of thousands of filament threads), winding tows around a rotating metal mold (mandrel) while impregnating the tows with a polymer matrix, and then removing the core after curing, and the method is suitable for forming tubular products. The "sheet-winding molding method" comprises the same basic process as that of the filament-winding molding method, except for winding prepregs instead of tows around a mandrel, and then removing the core after curing. The "press molding method" comprises placing a compound or a prepreg in a mold, followed by pressurization and heating. The "autoclave molding method" comprises laminating prepregs in a mold, covering the mold with a bag, removing air or volatile matter existing in an autoclave under reduced pressure, followed by pressurization and heating. The "RTM method" is also referred to as a resin-injection molding method, and comprises introducing a molten thermosetting resin into a closed system, in which a reinforcing fiber preform is placed in a mold under low pressure, heat curing, and then demolding. The "VaRTM method" is a type of the RTM method and comprises vacuuming the closed system, in which reinforcing fibers are laminated, introducing a thermosetting resin, heat curing, and then demolding. The "SMC molding method" comprises laminating sheet-shaped materials each composed of reinforcing fibers and a polymer matrix. The "vacuum bag molding method" comprises vacuuming a laminated product sealed with a closed film, and thus molding by compression with atmospheric pressure. The "hand lay-up molding method" comprises manually laminating prepregs in a forming mold for curing formation. Further, the fiber-placement molding method" comprises laminating prepregs processed into a tape form or tows impregnated with a polymer matrix into various three-dimensionally shaped molds for curing formation. All of the specific methods of these molding methods are known in the fields of fiber-reinforced composite materials, and may be performed in reference to these known methods.

When short fiber bagworm silk thread is used as reinforcing fiber, basic operation therefor may be performed in the same manner as in the conventional method for producing fiber-reinforced composite material. An example of such a method comprises dispersing short fiber bagworm silk threads in a molten polymer matrix, contacting the both, introducing a mixture thereof into a desired mold, curing, and then forming. After short fiber reinforcing fibers are dispersed onto the surface of a polymer matrix, the fibers and the matrix are integrated by thermal contact bonding, and then a structure comprising a polymer matrix layer and a reinforcing fiber layer can be formed.

3-3. Production Process

The production process of the method for producing the fiber-reinforced composite material of the present invention includes a contact process as an essential process, and also includes a molding process, a curing process, and a demolding process, as necessary. Each process will be described in detail below.

(1) Contact Process

The "contact process" is a process of contacting reinforcing fibers with a polymer matrix. A contact method is not particularly limited, as long as both components can directly contact each other. Reinforcing fiber may be dispersed, immersed into or impregnated with a dissolved liquid polymer matrix, or a fiber bundle or a sheet of reinforcing fibers may be sandwiched between polymer matrix sheets as in the case of the SMC molding method.

The aforementioned prepreg is prepared by impregnating a sheet composed of reinforcing fibers with a polymer matrix, and the process is composed only of a contact process.

(2) Molding Process

The "molding process" is a process of molding reinforcing fibers and/or a polymer matrix as components of the fiber-reinforced composite material into a desired shape. This process is an optional process, which is performed in accordance with various production methods.

In this process, molding is performed according to the mold using a mold such as a metal mold. If necessary, reinforcing fiber or prepreg may be laminated for molding. The order of the molding process and the above contact process can vary depending on a production method to be used herein and thus is not limited. For example, a molding process is performed after the contact process in the case of the above filament-winding molding method, sheet-winding molding method, press molding method, autoclave molding method, hand lay-up molding method, fiber-placement molding method, and the like. On the other hand, in the case of the RTM method or the VaRTM method, the contact process is performed after the molding process, because a polymer matrix is introduced into a metal mold after the formation of a preform of reinforcing fibers using the metal mold. The contact process and the molding process may be performed in any order suitable for each production method.

(3) Curing Process

The "curing step" is a process of accelerating and/or completing the polymerization reaction of a polymer matrix after the above processes. In this step, a polymer matrix is cured, and thus the formation of a fiber-reinforced composite material is completed. The curing process can include a heating step and/or a cooling step.

The "heating step" is a step of accelerating and/or completing the polymerization reaction by heating a polymer matrix, and is performed when a thermosetting resin is used as a polymer matrix. On the other hand, when a polymer matrix is a thermoplastic resin or a naturally occurring polymer, polymerization is cancelled by heating and instead the polymer matrix is softened or dissolved. Hence, this step may be applicable to the contact process or the molding process.

The heating temperature is not particularly limited, and varies depending on the type of a polymer matrix to be used. In general, heating may be performed at 20° C. to 250° C., 23° C. to 200° C., 25° C. to 180° C., 27° C. to 150° C., or 30° C. to 120° C. Further, the heating time is associated with the heating temperature. Generally, the lower the heating temperature, the longer the heating time, and the higher the heating temperature, the shorter the heating time. Heating may generally be performed for 0.5 hours to 48 hours, 1 hour to 42 hours, 1.5 hours to 36 hours, 2 hours to 30 hours, 2.5 hours to 24 hours, or 3 hours to 18 hours.

The "cooling step" is a step of cooling a heated polymer matrix, or curing the same by cooling. When a thermosetting resin is used as a polymer matrix, the cooling process is performed for cooling a fiber-reinforced composite material after completion of a thermosetting reaction in the heating process. Further, when a thermoplastic resin or a naturally-occurring polymer is used as a polymer matrix, polymerization reaction is accelerated and/or completed by cooling, the polymer matrix is cured, and thus the formation of a fiber-reinforced composite material is completed.

Also, the cooling temperature is not limited, and varies depending on the type of a polymer matrix to be used. Cooling may be performed generally at 260° C. or lower, 200° C. or lower, 180° C. or lower, 150° C. or lower, 120° C. or lower, 100° C. or lower, 90° C. or lower, 80° C. or lower, 70° C. or lower, 60° C. or lower, 50° C. or lower, 40° C. or lower, 35° C. or lower, 30° C. or lower, 27° C. or lower, 25° C. or lower, 23° C. or lower, 20° C. or lower, 18° C. or lower, 15° C. or lower, or 10° C. or lower. The lower limit of the temperature is not particularly limited, and may be generally about 4° C., 0° C., −10° C., −15° C., or −20° C. Further, regarding the cooling time, cooling may be performed for 0.1 hours to 1 hour, 0.2 hours to 0.9 hours, 0.3 hours to 0.8 hours, 0.4 hours to 0.7 hours, or 0.5 hours to 0.6 hours.

(4) Demolding Process

The "demolding process" is a process for demolding the fiber-reinforced composite material from the mold after the curing process. Specifically, in this process, a completed fiber-reinforced composite material is removed from a metal mold or a mandrel used upon the molding process. The demolding method may be performed according to the methods known in the art.

EXAMPLES

Example 1: Production of Fiber-Reinforced Composite Material Containing Bagworm Silk Thread as Reinforcing Fiber (1)

(Purpose)

A fiber-reinforced composite material containing the bagworm silk thread as reinforcing fiber is prepared, and the physical properties thereof are verified.

(Method)

Long-fiber bundle of the bagworm silk thread was used as reinforcing fiber, and an ethylene-vinyl acetate copolymer (EVA) resin was used as a polymer matrix.

Long-fiber bundles of the bagworm silk thread was prepared according to the method described in the specification of Japanese Patent Application No. 2017-110003. The bagworms used herein were the last instars of *Eumeta japonica* collected at an orchard in Tsukuba, Ibaraki, Japan. An approximately square metal is described in Example 1 of the specification of Japanese Patent Application No. 2017-110003 was used as a production apparatus of the long fiber of the bagworm silk thread. In the metal can, a closed ring-like rail with its floor directed upward, which has a width of 1.7 mm and a perimeter of 1.1 m, is on the upper edge of the plate member corresponding to the side surface of the metal can. One bagworm was placed on the rail. After observing the state that the bagworm moves around the rail with spinning of threads, the bagworm was left on the rail at room temperature. Two days later, the bagworm was collected from the apparatus, and then the bagworm silk thread overlapped with each other on the rail were removed with a scraper. A long-fiber bundle consisting of 150 or more single filaments was collected, wherein the bagworm silk thread with a total length of about 150 m were tied together into ring-shaped with a peripheral length of 1.1 m. Subsequently, the long-fiber bundle was boiled in a 0.05 mol/L aqueous solution of sodium carbonate for 2 minutes. After washing with pure water, the bagworm silk threads were dried in air. The resultant was used as the reinforcing fiber.

An adhesive resin for a hot gun (TAIYO ELECTRIC INDUSTRY CO., LTD) was used as an EVA resin. As an alternative for a metal mold, a formwork with a longitudinal length of 35 mm and a horizontal length of 10 mm was prepared from a 0.5 mm thick silicone rubber sheet, the EVA resin was placed in the formwork and then pressed at 1 to 2

MPa, thereby preparing two EVA resin sheets. Next, the prepared long-fiber bundle (BSF) of the bagworm silk thread or control carbon fiber (CF), as reinforcing fibers, were sandwiched between the EVA resin sheets, pressed at 1 to 2 MPa with two hot plates heated to 100° C., and then cooled, thereby obtaining a fiber-reinforced composite material (BSF/EVA composite material) comprising the long-fiber bundle (BSF) of the bagworm silk thread and the EVA resin, and a fiber-reinforced composite material (CF/EVA composite material) comprising the carbon fiber (CF) and the EVA resin. At the same time, an EVA resin alone was prepared as a negative control by pressing only two EVA resin sheets without reinforcing fiber.

Test pieces were cut out from the obtained sheets along the reinforcing fibers, and then subjected to a mechanical test described later. The mass percentage of the reinforcing fibers relative to the total mass of each test piece was calculated to give a fiber content (mass %: wt %).
(Results)

The results of the mechanical test conducted for the BSF/EVA composite material and the EVA resin (n=3) are shown in Table 1.

TABLE 1

|  |  | Fiber content (wt %) | Elastic modulus (MPa) | Maximum strength (MPa) | Strain (%) | Difference in elastic modulus (MPa) | Difference in strength (MPa) |
|---|---|---|---|---|---|---|---|
| EVA resin alone | 1 | — | 19.0 | 2.4 | 163.8 | — | — |
|  | 2 | — | 32.7 | 3.1 | 233.0 | — | — |
|  | 3 | — | 32.6 | 2.5 | 756.7 | — | — |
| BSF/EVA composite material | 1 | 2.28 | 200.9 | 11.9 | 43.6 | 181.9 | 9.5 |
|  | 2 | 2.15 | 198.6 | 11.9 | 33.3 | 165.9 | 8.9 |
|  | 3 | 1.81 | 148.9 | 9.7 | 33.3 | 116.3 | 7.3 |

In Table 1, the term "elastic modulus" refers to the initial elastic modulus. This corresponds to a value given as the initial slope of a stress-strain curve, which corresponds to the proportional constant in the deformation area meeting Hooke's law, which is the proportional relationship between stress and strain when a sample is pulled. In general, a higher value of the initial elastic modulus means a smaller strain for a given tensile stress, meaning more stiffness. Further, the term "maximum strength" refers to maximum stress immediately before break. In general, the larger the numerical value of maximum strength, the stronger the tolerance of the strong stress. Further, the term "strain" refers to elongation at break, specifically the increased length of a sample at its break point. In general, the larger numerical value of the strain means the material having higher elasticity. The terms "difference in elastic modulus" and "difference in strength" refer to a difference in elastic modulus and a difference in maximum strength between a resin alone and a fiber complex.

Figure 1:
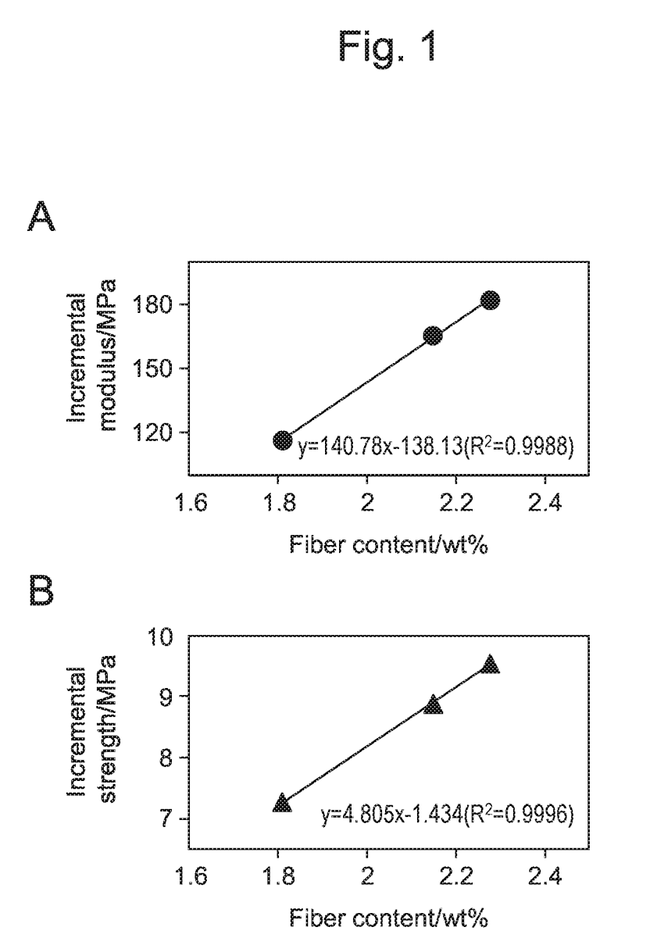
FIG. 1 shows the relationship between bagworm silk fiber (BSF) content and elastic modulus or strength. (A) shows the relationship between BSF content and difference in elastic modulus (Incremental modulus/MPa), and (B) shows the relationship between BSF content and difference in strength (Incremental strength/MPa).

In the case of the BSF/EVA composite material, significant increases in elastic modulus and maximum strength were observed compared with that of the EVA resin alone. This suggests that the hardness and strength of the BSF/EVA composite material were higher than those of the EVA resin alone. Further, when the values representing differences in elastic modulus (A) and differences in strength (B) were plotted with respect to the fiber content, as depicted in FIG. 1, it was confirmed in both cases that the values linearly increased with a high correlation as the fiber content increased. These results confirmed that through the use of the bagworm silk thread as reinforcing fibers, hardness (high elastic modulus) and strength (high strength) can be imparted to the EVA resin.

Furthermore, the strain (breaking elongation) of the BSF/EVA composite material exceeded 30% in all cases of three times of measurement (Table 1). These results suggest that by using the bagworm silk thread as reinforcing fiber of a fiber-reinforced composite material, a problem of low breaking elongation, which has been a problem upon the use of conventional carbon fiber or glass fiber as reinforcing fiber, can be significantly improved.

The above results revealed that the bagworm silk thread, at the fiber content as low as about 2 wt %, can efficiently improve the mechanical properties such as strength, elastic modulus, and breaking elongation of the polymer matrix, and by varying the fiber content thereof, the contribution to mechanical properties can be controlled.

Example 2: Production of Fiber-Reinforced Composite Material Containing Bagworm Silk Thread as Reinforcing Fiber (2)

(Purpose)

A fiber-reinforced composite material is prepared using bagworm silk threads as reinforcing fiber and a polymer matrix differing from that of Example 1, and then the physical properties thereof are verified.
(Method)

The EVA resin used in Example 1 was a soft resin that can be extended several folds. In this example, a fiber-reinforced composite material (BSF/PS composite material) using a polystyrene resin (PS resin) (Eiken Chemical Co., Ltd.), which was a hard resin having elongation lower than that of the EVA resin and having a breaking elongation of about only 5%, as a polymer matrix was prepared, and then the mechanical properties thereof were verified in the same manner as in Example 1.

Basic conditions were according to the method of Example 1, except that the pressing condition was 10 MPa to 12 MPa at 150° C.
(Results)

The results of the mechanical test conducted for the BSF/PS composite material and the PS resin alone are shown in Table 2.

TABLE 2

|  | Fiber content (wt %) | Maximum strength (MPa) | Strain (%) |
|---|---|---|---|
| PS resin alone | — | 26.1 | 5.2 |
| BSF/PS composite material | 1.1 | 25.8 | 33.8 |

As shown in Table 2, while the PS resin alone exhibited a strain (breaking elongation) of only 5.2%, the BSF/PS composite material prepared through complexation of the fiber bundles of the bagworm silk thread exhibited an improved strain of 33.8%. The results revealed that even when a polymer matrix to be used for the fiber-reinforced composite material is a hard resin exhibiting breaking elongation lower than that of the bagworm silk thread, high breaking elongation which is a property of the bagworm silk thread can be imparted to the fiber-reinforced composite material.

Example 3: Production of Fiber-Reinforced Composite Material Containing Short-Filament Bagworm Silk Thread as Reinforcing Fiber (Purpose)

The physical properties of a fiber-reinforced composite material containing short filament bagworm silk thread as reinforcing fibers are verified.

(Method)

Short-fiber bagworm silk thread was used as reinforcing fiber and polyvinyl alcohol (PVA) (Uehara Chemical Co., Ltd. (Kabushikigaisha Uehara Kagaku)) was used as a polymer matrix.

A single fiber of the bagworm silk thread was cut in such a manner that the longer axis had a length of about 5 mm, thereby preparing short fiber. Subsequently, short fibers were dispersed in an aqueous PVA solution, and then shaped on slide glass, thereby obtaining a film as a BSF/PVA composite material. The fiber content was represented by the mass percentage of the short-fiber bagworm silk thread relative to the total dry mass of the film. Strip-shaped test piece was cut out from the film, and then subjected to the following mechanical test.

(Results)

The BSF/PVA composite material with a fiber content of 3.74 wt % exhibited an elastic modulus of 184.1 MPa, which was improved by 10 or more times compared with that of the single PVA resin alone (elastic modulus of 14.1 MPa). This result suggests that even when bagworm silk thread is short fiber, significantly high elastic modulus can be imparted to the fiber-reinforced composite material.

Example 4: Thermal Decomposition Evaluation Test for Bagworm Silk Thread (Purpose)

Production of a fiber-reinforced composite material can comprise heat treatment in order to cancel or accelerate the polymerization of a polymer matrix. For example, when a polymer matrix is a thermoplastic resin, the resin is softened or dissolved since the polymerization is cancelled by heating. In contrast, when a polymer matrix is a thermosetting resin, the resin is cured since the polymerization is accelerated by heating. In both cases, under production of the fiber-reinforced composite material, both the polymer matrix and the reinforcing fibers are exposed to high temperature. Since the bagworm silk thread is made of proteins, when the threads are heated to a temperature higher than the heat-resistant temperature, the fibers themselves are denatured, decomposed, or the like, and thus the effects of the invention may not be exhibited. Accordingly, the heat-resistant temperature of the bagworm silk thread is examined.

(Method)

The bagworm silk thread was treated for 1 hour at each temperature between 130° C. and 300° C., and then the percentage mass loss (%) due to thermal decomposition was evaluated by thermal gravimetric analysis (TGA). The experiment was carried out under nitrogen-substituted atmosphere ($N_2$ flow) and under atmosphere (Air flow).

(Results)

Figure 2:
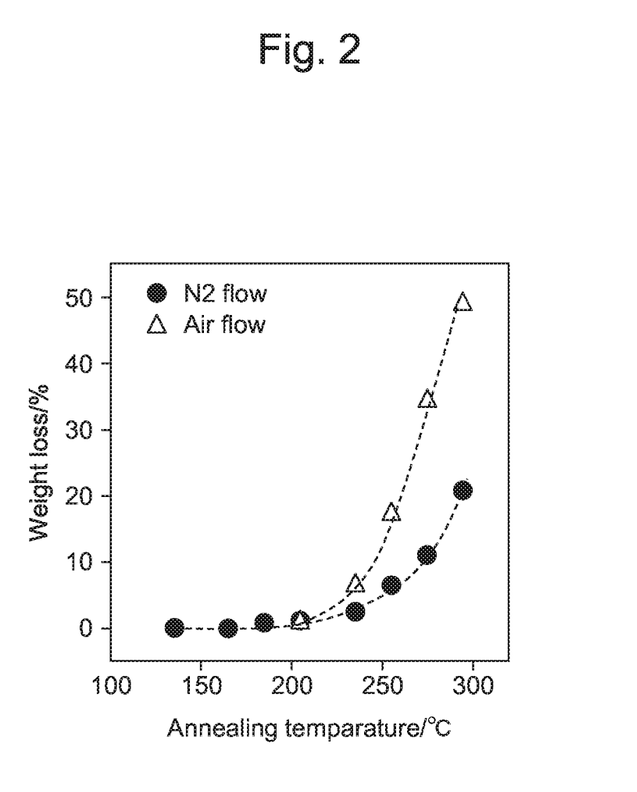
FIG. 2 shows the results of a test for evaluation of thermal decomposition of the bagworm silk thread. $N_2$ flow indicates "under nitrogen-substituted atmosphere" and Air flow indicates "under atmosphere".

The results are depicted in FIG. 2. Under nitrogen-substituted atmosphere, the mass loss due to heat was 10% or less even after 1 hour of treatment at 260° C. This suggests that the effect of thermal decomposition of the bagworm silk thread can be almost ignored at 260° C. or lower, and at the same time, when heat treatment was performed at 260° C., the reinforced fiber composite material of the present invention can be produced.

All publications, patents, and patent applications cited herein are incorporated herein by reference in their entirety.

The invention claimed is:

1. A fiber-reinforced composite material, containing a polymer matrix(es) and reinforcing fibers,
   wherein the reinforcing fibers comprise bagworm silk threads, and
   wherein the reinforcing fibers are placed in three or more directions onto a non-woven fabric sheet comprising the composite material.

2. The fiber-reinforced composite material according to claim 1, further containing organic fibers other than the bagworm silk threads, inorganic fibers, or a combination thereof.

3. The fiber-reinforced composite material according to claim 1, further comprising a fabric or knit composed of all, or part of, the bagworm silk threads.

4. The fiber-reinforced composite material according to claim 1, wherein the polymer matrix is selected from the group consisting of a resin, a glue, a starch, an agar, or a combination thereof.

5. The fiber-reinforced composite material according to claim 1, wherein the bagworm silk threads in the fiber-reinforced composite material has a mass percentage ranging from 0.5 mass % to 50 mass %.

* * * * *